(12) United States Patent
Quinn

(10) Patent No.: US 10,092,141 B2
(45) Date of Patent: Oct. 9, 2018

(54) DISPOSABLE FLUID SEPARATOR

(71) Applicant: My Family's Seasonings, LLC, Lakeland, FL (US)

(72) Inventor: Christine Y. Quinn, Lakeland, FL (US)

(73) Assignee: My Family's Seasonings, LLC, Lakeland, FL (US)

( * ) Notice: Subject to any disclaimer, the term of this patent is extended or adjusted under 35 U.S.C. 154(b) by 55 days.

(21) Appl. No.: 15/343,736

(22) Filed: Nov. 4, 2016

(65) Prior Publication Data

US 2017/0231434 A1 Aug. 17, 2017

Related U.S. Application Data

(60) Provisional application No. 62/251,986, filed on Nov. 6, 2015.

(51) Int. Cl.
| | | |
|---|---|---|
| *A47J 43/28* | (2006.01) | |
| *B65D 33/01* | (2006.01) | |
| *B65D 33/25* | (2006.01) | |
| *B65D 33/06* | (2006.01) | |
| *B01D 17/02* | (2006.01) | |

(52) U.S. Cl.
CPC ........ *A47J 43/284* (2013.01); *B01D 17/0214* (2013.01); *B65D 33/01* (2013.01); *B65D 33/2566* (2013.01); *B65D 33/065* (2013.01); *B65D 33/2591* (2013.01)

(58) Field of Classification Search
CPC ................ B65D 33/08; B65D 33/2508; B65D 33/2591; B65D 33/01; B65D 33/06; B65D 33/065; B65D 33/16; B65D 33/2566; A47J 43/284; A47J 43/285; B01D 17/0214

USPC ..... 99/495–496; 141/331, 337, 344; 383/10, 383/41, 63, 67, 907
See application file for complete search history.

(56) References Cited

U.S. PATENT DOCUMENTS

| | | | |
|---|---|---|---|
| 2,799,437 A | | 7/1957 | Jepson |
| 3,865,023 A | | 2/1975 | Halvorsen |
| 4,637,061 A | * | 1/1987 | Riese ..................... B65D 31/12 206/219 |
| 4,715,963 A | | 12/1987 | Jones |
| 5,240,112 A | * | 8/1993 | Newburger ........ B65D 33/2508 206/524.8 |
| 5,592,697 A | * | 1/1997 | Young .................. A41D 27/201 2/247 |

(Continued)

OTHER PUBLICATIONS

Bill, MacGyver's Fat Separator, Simple Way to Make Homemade Gravy, Nov. 4, 2012, We Are not Foodies, pp. 1-7, Accessed Feb. 23, 2018, http://wearenotfoodies.com/macgyvers-fat-separator-simple-way-to-make-homemade-gravy/ (Year: 2012).*

*Primary Examiner* — David C Mellon
(74) *Attorney, Agent, or Firm* — GrayRobinson, P.A.; Michael J. Colitz, III

(57) ABSTRACT

The present disclosure relates to a bag for separating fluids with differing densities. In particular the disclosure relates to a kitchen utensil that can use to separate, for example, gravy or pan juices from cooking fat. The bag includes upper and lower openings and an upper handle. Cooking juices can be placed into the bag via the upper opening. Once closed, the fat will rise while the gravy collects at the bottom of the bag adjacent the lower closure. The lower closure can then be opened to let out the gravy.

8 Claims, 2 Drawing Sheets

(56) References Cited

U.S. PATENT DOCUMENTS

| | | | | |
|---|---|---|---|---|
| 5,782,562 A | * | 7/1998 | Anspacher | B65D 33/08 |
| | | | | 383/15 |
| 6,689,279 B1 | | 2/2004 | Train | |
| 7,004,631 B1 | * | 2/2006 | Egashira | B65D 33/2591 |
| | | | | 383/117 |
| 8,574,650 B2 | | 11/2013 | Turover et al. | |
| 2003/0016889 A1 | * | 1/2003 | Ichikawa | B29C 45/14336 |
| | | | | 383/204 |
| 2003/0148004 A1 | * | 8/2003 | Kawaguchi | A61J 1/10 |
| | | | | 426/115 |
| 2010/0003887 A1 | * | 1/2010 | Greene | B65D 29/04 |
| | | | | 446/75 |
| 2011/0116730 A1 | * | 5/2011 | Kawakami | B65D 33/2525 |
| | | | | 383/41 |
| 2013/0277392 A1 | * | 10/2013 | Dominguez | B65D 75/5811 |
| | | | | 222/107 |
| 2015/0183555 A1 | * | 7/2015 | Mitsui | B65D 33/2533 |
| | | | | 383/10 |
| 2017/0021973 A1 | * | 1/2017 | Bray | B65D 31/02 |
| 2017/0172349 A1 | * | 6/2017 | Freyre | A47J 43/284 |

* cited by examiner

DISPOSABLE FLUID SEPARATOR

CROSS REFERENCE TO RELATED APPLICATIONS

This application claims priority to and is a continuation of patent application Ser. No. 62/251,986 entitled "Disposable Fluid Separator" filed on Nov. 6, 2015. The contents of this application are incorporated herein for all purposes.

TECHNICAL FIELD

This disclosure relates to a bag for separating fluids with differing densities. More particularly, the present disclosure relates to a disposable bag that is used in separating cooking fluids, for example, fat and gravy.

BACKGROUND OF THE INVENTION

One of the most difficult tasks in the kitchen is making gravy. A critical gravy making step is separating the cooking fat from the pan juices. If this step is not preformed correctly, the gravy will be fatty and unpalatable. Over the years various kitchen devices has been devised that allow fat and gravy to be more easily separated.

An example of one such device is disclosed in U.S. Pat. No. 2,799,437 to Jepson. Jepson discloses a separator for separating liquids of different specific gravity. It is a complicated appliance including a pitcher like body with a valve and an opening. Grease can be separated from water by tilting the body of the pitcher until the layer of the grease is well above the opening.

A further example is disclosed in U.S. Pat. No. 3,865,023 to Halvorsen. Halvorsen discloses a kitchen appliance for skimming fat. Upper and lower vessels are provided; a valve control arrangement is located in the upper vessel to control the leakage of the heavier component of the fluid from the bottom of the vessel.

Although each of the foregoing devices achieves its own unique objective, all suffer from common drawbacks. For example, each of these devices includes a complicated design that is subject to clogging or other fluid disruption. Additionally, each of the devices is designed to be used repeatedly and must therefore be thoroughly cleaned after each such use. The separator of the present disclosure is designed to fulfill these and other shortcomings present with existing separators.

SUMMARY OF THE INVENTION

The present invention relates to a device for separating fluids of different densities.

It is one of the objects of the present invention to provide a bag that can be used as a kitchen utensil to separate gravy from fat.

It is yet another object of the present invention to create a fluid separation bag that has few if any moving parts.

It is a further object of the present disclosure to provide a fluid separation bag that is inexpensive and that can be purchased in large quantities.

Still yet a further object of the present disclosure is to provide a gravy separator that is disposable and that does not require washing or maintenance.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

DETAILED DESCRIPTION OF THE DRAWINGS

The present disclosure relates to a bag for separating fluids with differing densities. In particular the disclosure relates to a kitchen utensil that can use to separate, for example, gravy or pan juices from cooking fat. The bag includes upper and lower openings and an upper handle. Cooking juices can be placed into the bag via the upper opening. Once closed, the fat will rise while the gravy, collects at the bottom of the bag adjacent the lower closure. The lower closure can then be opened to let out the gravy. In this manner, the device allows a first fluid of a lower density to be separated from a second fluid of a higher density.

Figure 1:
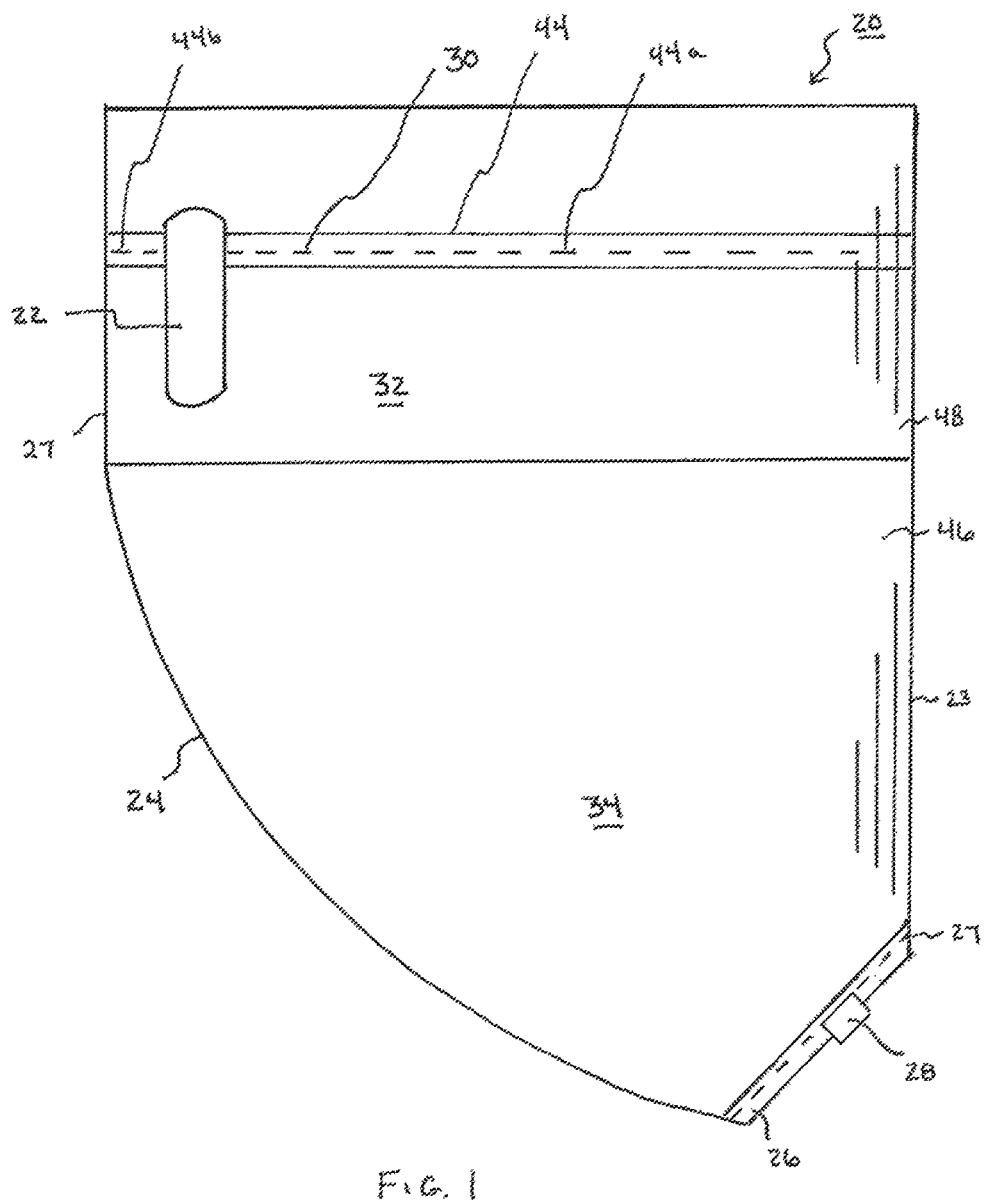
FIG. 1 is a side view of the fluid separating bag of the present disclosure.
Figure 2:
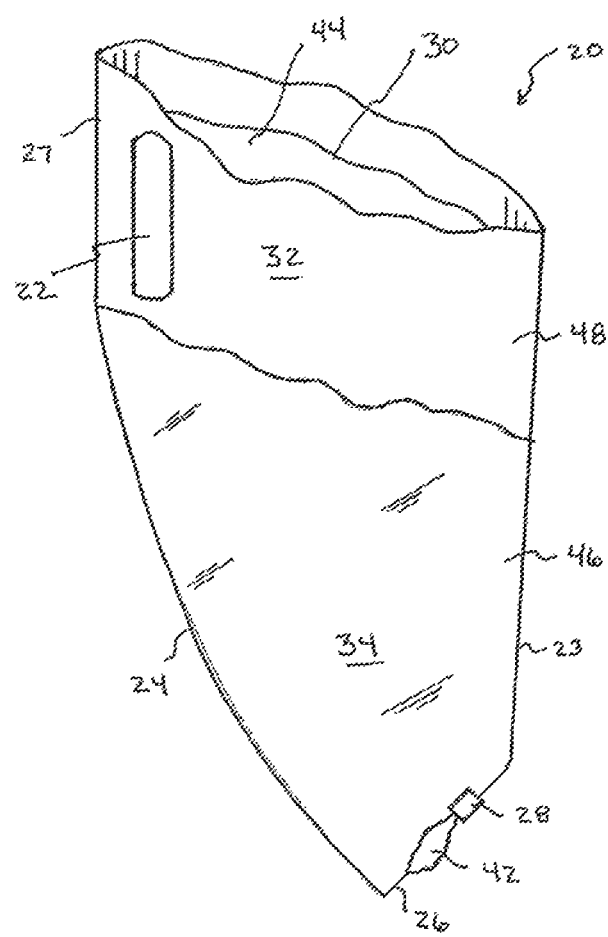
FIG. 2 is a perspective view of the fluid separating bag of the present disclosure.

The present invention is described in connection with FIG. 1. Bag 20 is preferably constructed as a lightweight, flexible bag. Bag 20 is preferably formed from two opposing sheets of a lightweight, transparent polymer. These opposing sheets are bonded along forward and rearward edges (23 and 27). Bag 20 further including upper and lower edges. In the preferred embodiment, the lower edge extends at approximately a 45° angle relative to the upper edge. In other words, the lower edge extends upwardly at approximately a 45° angle relative to the horizontal. The opposing sheets are also being bonded along a curved portion 24 that extends between the rearward and lower edges. A first opening 30 is formed along the upper edge and a second opening 26 is formed within the lower edge. Opening 30 preferably extends along the entire length of the upper edge.

A handle 22 is formed at the upper end of bag 20, preferably by forming a fluid tight opening through both of the opposing sheets. The handle preferably includes a sealed peripheral edge to prevent fluid leakage. Bag 22 can be formed in any of a variety of shapes and sizes. The depicted embodiment is a quart sized bag with a curved side edge 24 and angled lower opening 26. The angled opening 26 and the curved side edge 24 together constitute a spout that assists the higher density fluids being dispensing from the bottom of bag 20.

A first zip locking closure 44 is positioned within the first opening 30. Zip lock closure 44 includes male and female closure elements that can be selectively joined to close the first opening 44 in a fluid tight manner. Ideally, the male and female closures are such that they can be coupled or uncoupled by hand. In a preferred but non-limiting embodiment, closure 44 is positioned a short distance from the first opening 30. Zip lock closure 44 can also be formed in two parts. A first part 44(a) of closure 44 extends between the forward edge 23 of the bag and handle 22; a second part 44(b) of closure 44 extends between the handle 22 and the rearward edge 27.

A second zip locking closure 27 is formed along the second opening 26. Second zip locking closure 27 likewise includes male and female closure elements. However, unlike closure 44, closure 27 includes a zipper 28 for selectively joining the male and female closure elements. This permits the first and second closure elements to be easily joined together in a fluid tight manner. A suitable zip-lock closure is described in U.S. Pat. No. 7,029,178 to Gzybowski, the contents of this patent are fully incorporated herein for all purposes.

Bag 20 includes upper and lower internal areas formed within its interior. Specifically, a lower internal area 46 is bounded by the lower edge, the forward edge 23 and the curved portion 24, and an upper internal area 48 is bounded by the lower internal 46 area and the upper edge. In use, opening 30 can be used to fill bag 20 with pan juices to be separated.

In use, opening 30 is opened and the fluid to be separated is poured in. Prior to the fluid being delivered into bag 20, the user should ensure that zipper 28 is first closed to form a fluid tight seal at lower closure 26. Handle 22 can be used to hold bag 20. Holding bag in the orientation depicted in FIG. 1 causes the contained fluids to separate. More specifically, the higher density fluid will accumulate within the lower internal area 46 and the lower density fluid will accumulate within the upper internal area 48. In the case of pan juices, the higher density fluid would be gravy and the less dense fluid would be fat. This permits the gravy to accumulate in the area of opening 26. The user can then open zipper 28 to let the gravy to be poured out. Bag 20 is preferably transparent (at least in areas 46 and 48) so that the user can see the divide between the fluids being separated. This allows the user to close zipper 28 to seal opening 26 after the gravy has been dispensed. The ensures that no fat leaves bag 20. Thereafter, bag 20 and the enclosed fat can be disposed of. A number of bags 20 can be stored in rolled form in a box or other dispenser to allow bags to be sequentially dispensed.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A device for separating a first fluid of a lower density from a second fluid of a higher density, the device comprising in combination:
   a flexible bag formed from two opposing sheets of a lightweight, transparent polymer, the opposing sheets being bonded along forward and rearward edges, the bag further including upper and lower edges, the lower edge extending at approximately a 45° angle relative to the upper edge, the sheets also being bonded along a curved portion that extends between the rearward and lower edges, a first opening formed along the upper edge and a second opening formed within the lower edge;
   a handle formed within the bag adjacent the upper edge, the handle extending through the opposing sheets and including a sealed internal periphery;
   a first zip locking closure positioned within the first opening, the first zip locking closure including male and female closure elements that can be selectively joined to close the first opening in a fluid tight manner;
   a second zip locking closure formed along the second opening, the second zip locking closure including male and female closure elements, a zipper for selectively joining the male and female closure elements and thereby close the second opening in a fluid tight manner;
   upper and lower internal areas formed within the flexible bag, the lower internal area bounded by the lower edge, the forward edge and the curved portion, the upper internal area bounded by the lower internal area and the upper edge, whereby the second fluid accumulates within the lower internal area and the first fluid accumulates within the upper internal area, the position of the second opening permitting the second fluid to be dispensed from the device.

2. A disposable device for separating fluids comprising:
   a flexible bag formed from two opposing sheets, the opposing sheets being bonded along forward and rearward edges, the bag further including upper and lower openings, the lower opening extending upwardly at a 45° angle relative to the upper opening;
   a first zip locking closure positioned within the upper opening for selectively closing the upper opening in a fluid tight manner, the first zip locking closure including male and female closure elements that can be selectively joined to close the upper opening in a fluid tight manner;
   a second zip locking closure formed along the lower opening for selectively closing the lower opening in a fluid tight manner, the second zip locking closure including male and female closure elements that can be selectively joined to close the lower opening in a fluid tight manner.

3. The disposable device as described in claim 2 further comprising a curved edge extending between the rearward edge and the lower opening.

4. The disposable device as described in claim 3 wherein the angled lower opening and curved edge act as a funnel for fluid being dispensed from the lower opening.

5. The disposable device as described in claim 4 further comprising upper and lower internal areas formed within the flexible bag, the lower internal area bounded by the lower opening, the forward edge and the curved edge, the upper internal area bounded by the lower internal area and the upper opening.

6. The disposable device as described in claim 5 wherein a first fluid accumulates within the upper internal area and a second fluid accumulates within the lower internal area.

7. The disposable device as described in claim 2 wherein the opposing sheets are formed from a lightweight, transparent polymer.

8. The disposable device as described in claim 2 further comprising a handle formed within the bag adjacent the upper opening, the handle extending through the opposing sheets and including a sealed internal periphery.

* * * * *